United States Patent [19]

Taki

[11] Patent Number: 4,812,637

[45] Date of Patent: Mar. 14, 1989

[54] OPTICAL DISC HEAD WITH HIGH SIGNAL-TO-NOISE RATIO

[75] Inventor: Kazunari Taki, Nagoya-shi, Japan

[73] Assignee: Brother Kogyo Kabushiki Kaisha, Japan

[21] Appl. No.: 66,015

[22] Filed: Jun. 24, 1987

[30] Foreign Application Priority Data

Jul. 7, 1986 [JP] Japan ............................... 61-159346
Jul. 7, 1986 [JP] Japan ............................... 61-159347
Jul. 10, 1986 [JP] Japan ............................... 61-162431
Jul. 28, 1986 [JP] Japan ............................... 61-177357

[51] Int. Cl.$^4$ ........................................... G11C 13/06
[52] U.S. Cl. .................................... 250/201; 365/122
[58] Field of Search ................. 250/201 AF, 201 DF, 250/201 R; 350/374; 369/44–46; 365/122

[56] References Cited

U.S. PATENT DOCUMENTS

| | | | |
|---|---|---|---|
| 4,410,277 | 10/1983 | Yamamoto et al. | 365/122 |
| 4,464,437 | 8/1984 | Urner Wille et al. | 365/122 |
| 4,497,006 | 1/1985 | Deguchi et al. | 365/122 |
| 4,562,502 | 12/1985 | Ezaki et al. | 365/122 |
| 4,710,431 | 12/1987 | Van Engelen et al. | 365/122 |

Primary Examiner—David C. Nelms
Assistant Examiner—Stephone B. Allen
Attorney, Agent, or Firm—Parkhurst, Oliff & Berridge

[57] ABSTRACT

An optical head for an optical disc or for a magneto-optical disc for reading out information recorded thereon, including a light source for emitting a beam of linearly polarized light toward the disc, at least one Faraday rotator for passing the emitted beam and rotating a plane of polarization of the beam by a predetermined angle, at least one beam splitter for either passing or reflecting the incident light depending upon the plane of polarization, and a light sensor for sensing a light reflected by the splitter. Some combinations and configurations of these beam splitters and Faraday rotators are exemplified. This head is designed to be easily assembled and to effectively detect a light reflected by the optical disc, thereby providing reliable detection of data recorded thereon.

9 Claims, 9 Drawing Sheets

OPTICAL DISC HEAD WITH HIGH SIGNAL-TO-NOISE RATIO

BACKGROUND OF THE INVENTION

This invention relates to an optical head for an optical disc, which reads out information recorded thereon by utilizing a light beam reflected by the disc. The invention further relates to an optical head or a magneto-optical disc, which also reads out information recorded thereon, by thermo-magnetically changing the magnetic polarity. The head can also be used as a recording head.

Conventionally, the prior art optical reader generally has a polarized beam splitter and a quarter wavelength panel (hereinafter referred to as QWP). Both, placed in an optical path between an optical disc and a polarized light emitter, function for detecting a light beam reflected by the disc, and for reflecting the reflected light beam in a predetermined direction to prevent the reflected light beam from returning to the emitter, thereby avoiding mis-functioning of the system. In the aforementioned optical reader, a polarized light beam from the emitter is changed into a linearly polarized light beam by the splitter, then to a circularly polarized light beam by the QWP to be irradiated onto the optical disc. The beam reflected by the disc reverses its rotational direction of polarization to pass through the QWP again by which the beam is changed into a linearly polarized light beam again. This beam has its plane of polarization 90° different from that of the incident beam. The beam, then, is reflected by a polarized beam splitter in a predetermined direction to irradiate a light sensor. The prior art optical reader effectively detects a beam reflected by the optical disc because the reflected beam is prevented from returning to the emitter. But it has such a disadvantage in that the QWP is required to be placed on the optical path with its optical axis adjusted a strict 45° to the P plane of polarization of the beam splitter. Such adjustment needs time and care, resulting in troublesome work in assembling the optical head for the reader. Conversely, an optical disc head according to the present invention requires no troublesome adjustment of its optical system, but allows simplified assembly while still effectively detecting a beam reflected by the optical disc.

Another prior art device for reading out information recorded on a magneto-optical disc utilizes the Kerr effect wherein a plane of polarization of a linearly polarized beam reflected by a magnetic substance is rotated to a certain angle depending upon the magnetic polarity and strength of the disc. This device is generally provided with a half mirror placed in the optical path between the magneto-optical disc and a light source, e.g., a laser diode or the like, which generates a linearly polarized light beam. The half mirror splits a light beam by a predetermined ratio (e.g. 50:50). When a light beam fed from the light source is reflected by the disc, the half mirror splits the reflected beam, and feeds the split beams to an information signal detection system and a servo signal detection system. Each system generates the information signal representing the information recorded on the disc, and a servo signal representing the irradiation condition on the disc, respectively. The intensity of a beam fed from the light source, however, weakens by a certain ratio each time it goes through the mirror. This phenomenon deteriorates the S/N ratio of the detected signal, and requires a light source of greater capacity. Since some portion of light reflected by the disc is not reflected by the half mirror, it returns to the light source, introducing noise into the system.

SUMMARY OF THE INVENTION

An object of the invention is to provide an optical head for an optical disc or for a magneto-optical disc, which is easily assembled with no need for delicate adjustment, and whereby a beam reflected by an optical disc is effectively detected.

Another object of the invention is to provide an optical head for an optical disc or for a magneto-optical disc, whereby a beam reflected by the disc is transmitted in its entirety to a detection system, whereby the loss of the beam is prevented, return of the beam to the light source is prevented, and noise is avoided.

Another object of the invention is to provide an optical head for a magneto-optical disc which detects information recorded thereon, in accordance with the change in the plane of polarization of reflected light, by favorably splitting the reflected light, whereby the information is read out without error, irrespective of a change in reflectance of the disc.

Features of the optical head according to this invention include: a light source for emitting a beam of light toward an optical disc; a Faraday rotator, which is disposed between the light source and the optical disc, for rotating a plane of polarization of the light emitted from the light source by 45°; a beam splitter, which is disposed between the Faraday rotator and the light source, for passing a component with a specific plane of polarization of the light emitted from the light source, and for reflecting a light with a plane of polarization perpendicular to the specific plane of polarization which has again passed the Faraday rotator after being reflected by the optical disc; and a light sensor for sensing a light reflected by the beam splitter.

This optical head is for reading and writing an optical disc in which information is stored by means of a change in the reflectance of the surface, e.g., the one in which a plurality of pits are formed on the surface thereof, or another whose surface is reversibly altered from crystalline to amorphous by laser irradiation.

A light emitted toward the optical disc changes into a linearly polarized beam during passage of the beam splitter. A plane of polarization of the beam is rotated 45° by the Faraday rotator. The beam is irradiated onto the optical disc. The plane of polarization of the beam reflected by the optical disc is further rotated by 45° during a reverse pass through the Faraday rotator, resulting in a plane of polarization of 90° different from that of the incident light. Therefore, the beam splitter reflects all the reflected beam in a predetermined direction, which is then received by the light sensor.

Other features of the optical disc include: a light source for emitting a beam of linearly polarized light toward a magneto-optical disc; a first beam splitter, which is disposed between the light source and the magneto-optical disc, for passing a component with a specific plane of polarization of light emitted from the light source and for reflecting a light with a plane of polarization perpendicular to the specific plane of polarization; a first Faraday rotator, which is disposed between the first beam splitter and the magneto-optical disc, for rotating a plane of polarization of the light that has passed the first beam splitter by 45°; a second beam splitter, which is disposed between the first Faraday rotator and the magneto-optical disc, for passing the light that has passed the first Faraday rotator and for reflecting the light with a plane of polarization perpendicular to the plane of polarization of the light that has passed the first Faraday rotator; and first and second light sensors provided for sensing the light reflected from the first and second beam splitters respectively after being reflected by the optical disc.

A linearly polarized light emitted from the light source passes through the first Faraday rotator which rotates its plane of polarization 45°, and enters the second beam splitter. The second beam splitter passes the beam with no reflection so that the beam is irradiated onto the disc. The beam reflected by the disc has a plane of polarization rotated by a certain angle depending on the magnetic state of the irradiated point (Kerr effect). The reflected beam enters the second beam splitter which reflects a component of the beam with its plane of polarization rotated by the Kerr effect, and allows the other component of the beam to pass. The beam passing through the second beam splitter proceeds through the first Faraday rotator which further rotates the plane of polarization 45° to be 90° different from that of the incident light, and is reflected by the first beam splitter. This reflected beam and a previously Kerr-rotated beam are received by the first and second sensors.

The above structure may further include a third beam splitter for splitting a light beam reflected by the first beam splitter. The first light sensor receives a beam of light from the first beam splitter to generate a focusing and/or tracking control signal. The second light sensor receives beams of light from the second beam splitter and from the third beam splitter to generate a signal representative of information on the disc.

Other features of the optical head include: a light source for emitting a beam of linearly polarized light toward a magneto-optical disc; a first beam splitter, which is disposed between the light source and the magneto-optical disc, for passing a component with a specific plane of polarization of the light emitted from the light source and for reflecting a light with a plane of polarization perpendicular to the specific plane of polarization; a first Faraday rotator, which is disposed between the first beam splitter and the magneto-optical disc, for rotating a plane of polarization of the light that has passed the first beam splitter by 45°; a second beam splitter, which is disposed between the first Faraday rotator and the magneto-optical disc, for passing the light that has passed the first Faraday rotator and for reflecting the light with a plane of polarization perpendicular to the plane of polarization of the light that has passed the first Faraday rotator; a second Faraday rotator, which is disposed between the second beam splitter and the magneto-optical disc for rotating a plane of polarization of an incident light by 45° plus or minus a small angle; and first and second light sensors provided for sensing the light reflected from the first and second beam splitters respectively after being reflected by the optical disc.

In the optical head for the magneto-optical disc embodied as discussed above, a linearly polarized light emitted from the light source passes through a first beam splitter with the plane of polarization parallel to P1 plane. The plane of polarization rotates 45° to be parallel to P2 plane by passing the first Faraday rotator. When the beam passes through the second beam splitter, the plane of polarization is further rotated $(45+\alpha)°$ (or $(45-\alpha)°$) by the second Faraday rotator, where $\alpha$ is the small angle. The beam is then irradiated onto the magneto-optical disc. The irradiated beam is reflected with its plane of polarization rotated a certain angle either $+\theta$ or $-\theta$ depending upon the magnetic core of the irradiated point of the disc. The reflected beam again passes through the second Faraday rotator further rotating the plane of polarization $(45+\alpha)°$ (or $(45-\alpha)°$), and enters the second beam splitter. The beam splitter splits the incident beam into two: one with the P2 plane of polarization and the other with S2 plane of polarization perpendicular to the P2. The beam with the S2 plane of polarization is separated from the main optical path. The beam with the P2 plane of polarization goes through the second beam splitter and the first Faraday rotator where the plane of polarization further rotates 45° to become parallel to S1 which is perpendicular to P1. The beam with S1 plane of polarization is separated from the main optical path by the first beam splitter.

The following examples are well-known polarized beam splitters. One is a combination of two rectangular prisms made of optical glass like BK7 with the slanted surfaces put together and with a multilayer coating of various thin film dielectrics therebetween. Another one uses a birefringent crystal, such as calcite.

The following are well known and available for composing the Faraday rotators: Faraday glass such as paramagnetic substance FR-5 (trade name of HOYA Co., Japan); crystal of magnetic garnet such as YIG (yttrium-iron-garnet); and magnetic garnet crystal or thin film made therefrom which are provided with a permanent magnet or a coil for applying a predetermined magnetic field thereto.

Further features of the optical head according to this invention include: a light source for emitting a beam of linearly polarized light toward a magneto-optical disc; a first beam splitter, which is disposed between the light source and the magneto-optical disc, for passing a component with a specific plane of polarization of the light emitted from the light source and for reflecting a light with a plane of polarization perpendicular to the specific plane of polarization; a first Faraday rotator, which is disposed between the first beam splitter and the magneto-optical disc, for rotating a plane of polarization of the light that has passed the first beam splitter by 45°; a second beam splitter, which is disposed between the first Faraday rotator and the magneto-optical disc, for passing the light that has passed the first Faraday rotator and for reflecting the light with a plane of polarization perpendicular to the plane of polarization of the light that has passed the first Faraday rotator; a second Faraday rotator disposed between the second beam splitter and the magneto-optical disc for rotating a polarized plane of incident light by an angle of selected from among 22.5°, 67.5°, 112.5°, and 157.5°; and first and second light sensors provided for sensing the light reflected from the first and second beam splitters respectively after being reflected by the optical disc.

In the optical head embodied as described above, a linearly polarized light emitted form the light source passes through the first beam splitter with the plane of polarization parallel to P1 plane. The light passes through the first Faraday rotator which rotates the plane of polarization by 45°, becoming parallel to P2 plane. The light passes through the second beam splitter and the second Faraday rotator. The light passes through the second Faraday rotator with the plane of polarization rotated 22.5°, 67.5°, 112.5° or 157.5°. The light is then irradiated onto the disc, and is reflected with its plane of polarization rotated by an angle, either $+\theta$ or $-\theta$, depending upon the magnetic state of the irradiated point. The light reflected by the disc returns through the second Faraday rotator which rotates its plane of polarization by the predetermined angle, and enters the second beam splitter. The incident beam at the second beam splitter is split into one with the polarization plane parallel to P2, and the other with the polarization plane parallel to S2 perpendicular to P2. The light with the S2 plane of polarization is separated from the main optical path. The light with the P2 plane of polarization then goes through the second beam splitter and the first Faraday rotator, the plane of polarization being rotated 45° to be parallel to S1 plane perpendicular to P1 plane. The light with S1 plane of polarization is separated from the main optical path by the first beam splitter. The respective light beams split by each beam splitter are transmitted to the sensors by which detection signals, representing data recorded on the disc, are output in accordance with the change in polarization of the light beams.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Hereinafter, a first embodiment of the present invention will be described referring to FIGS. 1 and 2A through 2F.

Figure 1:
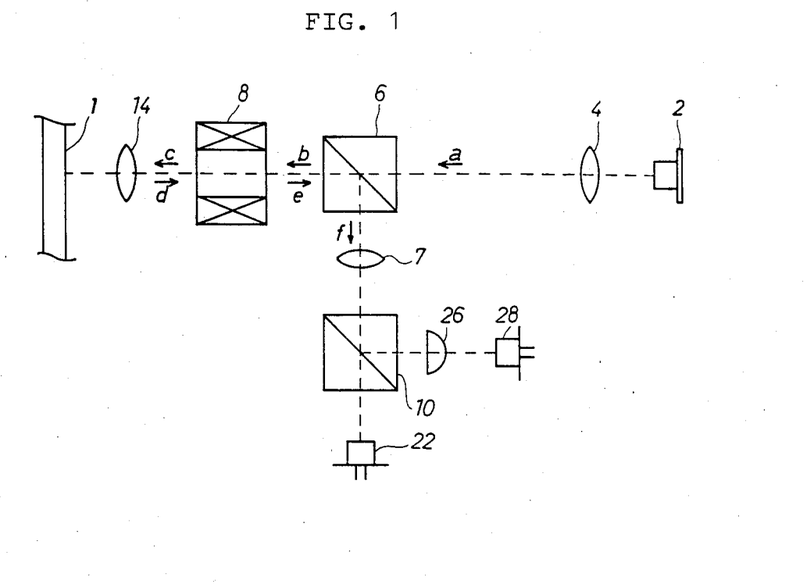
FIG. 1 is a schematic construction view illustrating an optical disc head according to a first embodiment of the present invention.
Figure 2A:
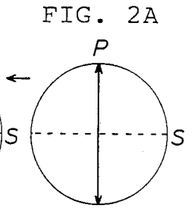
FIGS. 2A through 2F are explanatory views illustrating changes in the plane of polarization of a laser beam at the respective points on an optical path in the optical system shown in FIG. 1.

A reader for an optical disc 1 according to this embodiment, as shown in FIG. 1, has a semiconductor laser source (laser diode) 2 and a polarized beam splitter 6 for passing only a component of the laser beam with a plane of polarization parallel to the P plane of polarization, and for reflecting a component parallel to the S plane of polarization which is perpendicular to the P plane (FIG. 2A). The optical head according to this embodiment further has a Faraday rotator 8 for rotating the plane of polarization of the incident light beam coming from the splitter 6 by 45°.

Figure 2B:
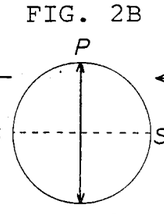
Figure 2C:
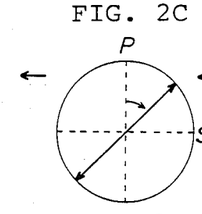
Figure 2D:
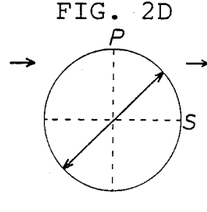
Figure 2E:
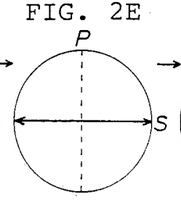
Figure 2F:
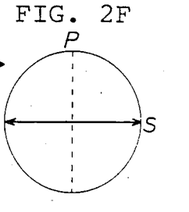

The splitter 6 is constructed by a combination of two triangular prisms made from an optical glass like BK7 having a multilayer of dielectric films coated there between on the common hypotenuse. The Faraday rotator 8 is designed to set its angle of rotation to 45° by supplying a magnetic field with an outer coil to a magnetic garnet crystal, e.g., YIG (yttrium-iron-garnet), placed in the optical path. A collimating lens 4, which parallels laser beams emitted from the laser diode 2, is provided between the laser diode 2 and the splitter 6. An objective lens 14, which converges the laser beam onto the surface of the disc 1, is further provided between the rotator 8 and the disc 1. A linearly polarized laser beam emitted from the laser diode 2 is paralleled by the collimating lens 4. The diode 2 and the splitter 6 are so arranged that the plane of polarization of the emitted light is parallel to the P plane of polarization of the beam splitter 6 (FIG. 2A). Namely, the incident laser beam goes through the splitter 6 without being reflected (FIG. 2B). The beam goes through the Faraday rotator 8 and the plane of polarization is rotated 45° in a predetermined direction (FIG. 2C). The beam is converged by the objective lens 14 and is focused on the surface of the optical disc 1. The laser beam reflected by the surface of the optical disc 1 is paralleled by the objective lens 14 again (FIG. 2D). The beam goes through the rotator 8 and its plane of polarization is further rotated 45° to become parallel to S plane (FIG. 2E). Therefore, the beam is reflected without loss in a 90° direction by the slanted surface of the splitter 6 (FIG. 2F).

The reflected laser beam is converged by a convergence lens 7 and is split into a passing beam and a reflected beam by a splitter 10, i.e., a half mirror. A cylindrical lens 26 and a 4D photo diode (a quarterly divided photo diode; hereinafter referred to as 4D-PD) 28 receives the reflected beam as a data signal and as a feedback signal for the astigmatic focusing control method. A 2D photo diode (a binary divided photo diode; hereinafter referred to as 2D-PD) 22 receives the passing beam as a tracking signal for the push-pull method.

In this embodiment, the Faraday rotator 8 is used for rotating the plane of polarization of the laser beam emitted from the laser diode 2 by 45° before and after the reflection on the disc surface. Two factors, dimensions of the core materials of the Faraday rotators 8 and the strength of the magnetic field applied to it, determine the rotation angle. When, therefore, dimensions of the core are determined, the angle depends upon the strength of the magnetic field. Thus, the rotation angle can be adjusted to 45° by adequately controlling the magnetic field, which largely simplifies the optical head assembly.

The Faraday rotator 8 uses a magnetic garnet such as YIG (yttrium-iron-garnet) in this embodiment; however, any material with fairly great Verdet's constant, e.g., paramagnetic Faraday glass such as FR-5 (trade name of HOYA Co., Japan) or a thin magnetic garnet film formed on a substrate, is available. Materials for the beam splitter are not limited only to an optical glass such as BK7, but a prism made of birefringent crystal such as calcite is available.

A second embodiment according to the invention is described referring to FIGS. 3 and 4A through 4K.

Figure 3:
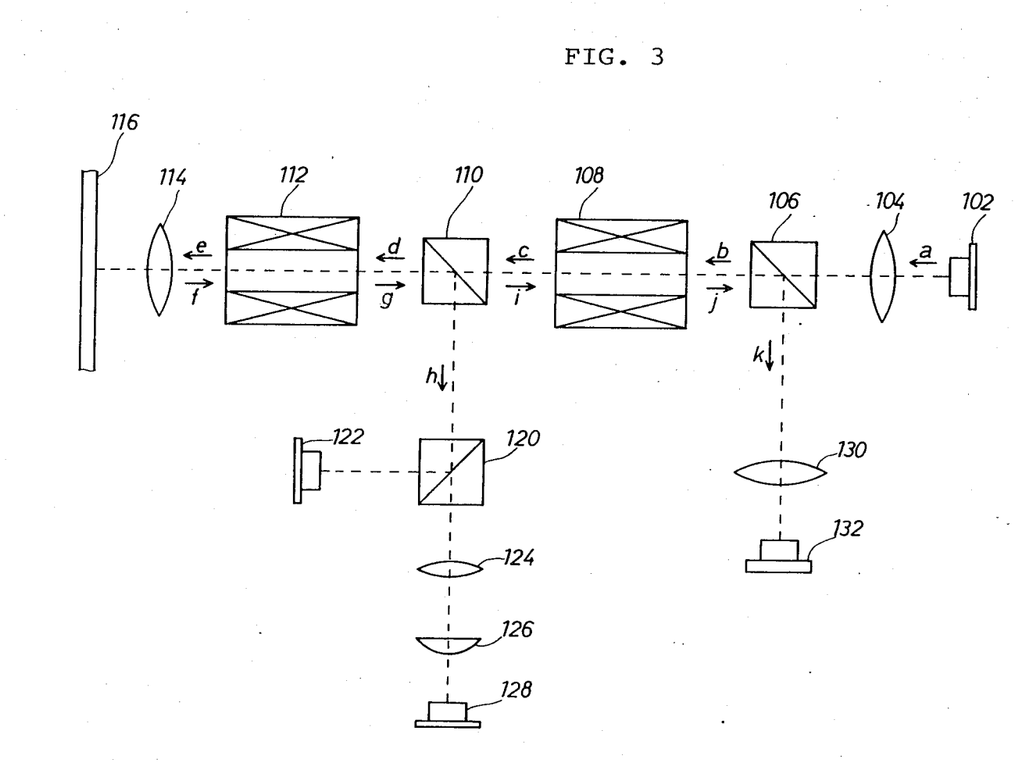
FIG. 3 is a schematic construction view illustrating the optical system of an optical reader of a second embodiment.
Figure 4A:
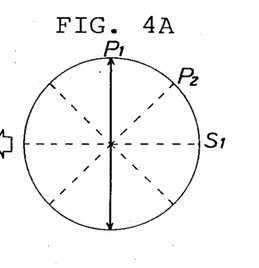
FIGS. 4A through 4K are explanatory views illustrating respective serial changes in the plane of polarization of a laser beam passing through the optical system in the optical disc head shown in FIG. 3.
Figure 4B:
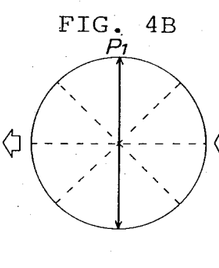
Figure 4C:
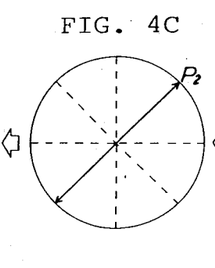

As shown in FIG. 3, in the optical head according to this embodiment, a light "a" with the plane of polarization parallel to P1 (FIG. 4A) is emitted from a laser diode 102, is paralleled by a collimating lens 104, and travels to a first polarized beam splitter 106. The splitter 106 is so constructed to pass only a component of the beam with a plane of polarization parallel to P1 and to reflect a component parallel to the S1 plane which is perpendicular to the P1. The incident beam "a" passes through the splitter 106. The passing laser beam "b" (FIG. 4B) enters a first Faraday rotator 108 by which the plane of polarization is rotated 45° to be parallel to the P2 plane (FIG. 4C). The laser beam "c" enters a second polarized beam splitter 110 which is so constructed to pass a beam with the P2 plane of polarization and to reflect a beam with the S2 plane of polarization which is perpendicular to the P2 plane. Accordingly, the incident beam "c" passes through the splitter 110 (FIG. 4D).

Figures 4D, 4E:
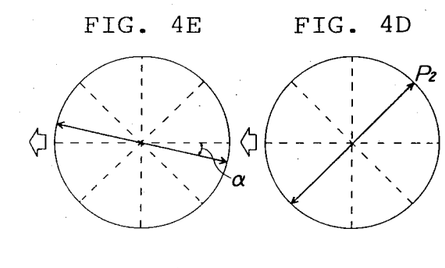
Figure 4F:
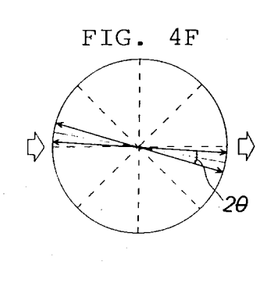
Figure 4G:
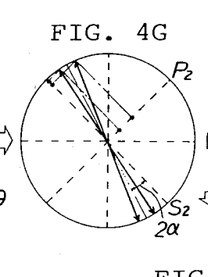
Figure 4H:
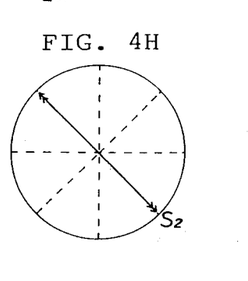
Figure 4I:
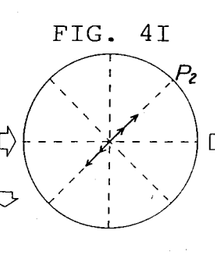
Figure 4J:
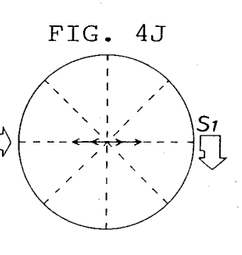
Figure 4K:
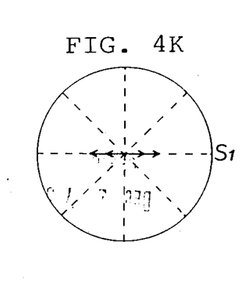

The laser beam "d" passing through the splitter 110 enters a second Faraday rotator 112 in which the plane of polarization is rotated $(45+\alpha)°$ from the P2 (FIG. 4E). The beam "e" passing through the rotator 112 is spotted onto a magneto-optical disc 116 by an objective lens 114. The beam "e" is reflected with its plane of polarization rotated $+\theta$ or $-\theta$ in response to a magnetic polarity, from a point where the beam is spotted on the disc. The reflecting beam "f" (FIG. 4F) again, enters the Faraday rotator 112 via the objective lens 114.

The laser beam "f" reflected by the magneto-optical disc 116 again passes through the rotator 112 which rotates the plane of polarization $(45+\alpha)°$ (FIG. 4G), and enters the beam splitter 110.

The rotational direction of a polarized beam in the Faraday rotator is determined in response to the passing direction of the beam. When the magnetic field is fixed, the rotational direction is reversed depending on the beam's passing direction. Thus, the rotational angle of the plane of polarization of the beam passing through the rotator from both directions is twice that of one direction.

The laser beam "g" has the plane of polarization $(90+2\alpha\pm\theta)°$ different from P2. The laser beam "g" with an intensity I is split by the rotator 110 into a beam "i" with the P2 plane of polarization (FIG. 4I) and an intensity $I \cdot \sin(2\alpha\pm\theta)$, and another beam "h" with S2 plane of polarization (FIG. 4H) and an intensity $I \cdot \cos(-2\alpha\pm\theta)$. The beam "h" is separated from the main optical path and further split 50:50 by a half mirror 120 into a passing and a reflecting beam. The beam reflected by the mirror 120 is fed directly to a 2D-PD 122. The beam passed through the mirror 120 is received by a 4D-PD 128 via a lens 124 and a cylindrical lens 126. The reflected beam and the passed beam are used respectively as a tracking error signal for the well-known push-pull method and a focus error signal for the astigmatic focusing method.

The laser beam "h" suffers little loss since the plane of polarization of the incident beam "g" is only $(2\alpha\pm\theta)°$ different from the reflecting plane of polarization S2 of the splitter 110. Thus, a light with greater intensity can be transmitted to the servo signal detection system, thereby providing a sufficient detection signal without being affected by noise. The intensity of the beam "h" is affected by a rather small Kerr rotational angle $\theta$, which is in response to the magnetized direction of the magneto-optical disc 116, thereby providing relatively constant control signals.

A plane of polarization of the laser beam "i" passing through the splitter 110 is rotated 45° by the rotator 108 to be in the S1 plane (FIG. 4J) and the resultant beam "j" enters the splitter 106. All of the incident beam "j" is separated from the main optical path without passing through the splitter 106. The reflected beam "k" (FIG. 4K) enters an avalanche photo diode 132 via a lens 130, and then, the intensity thereof is measured. The intensity of a laser beam "i" passing through the splitter 110 is proportional to $\sin(2\alpha\pm\theta)$, and greatly changes in response to the rotational direction ($\pm\theta$) of a beam reflected by the magneto-optical disc 116. By measuring the intensity of the beam "i" with the avalanche photo diode 132, the magnetic polarity of the spotted point of the disc 116, i.e., recorded information, is obtained. A laser beam emitted from the laser diode 102 and reflected by the magneto-optical disc 116 is transmitted in its entirety to either the servo signal detection system or to the information signal detection system without any loss, which results in effective utilization of the beam and reliable detection of signals. Moreover, light reflected by the disc 116 is prevented from returning to the laser diode 2, thus avoiding noise in the system.

The second embodiment utilizes the laser diode as a light source; however, a gas laser, a solid laser, or the like are available as well. Although the tracking error signal is detected by a push-pull method in this embodiment, the 3-beam method or other detecting methods are also available. The focus error signals can be used not only for the astigmatic detection method, but also for knife-edge or other detection methods. A beam split by the splitter 110 is almost the same as that of the beam reflected by the disc. Accordingly, the optical reader in accordance with this invention is able to read out the information recorded on an optical disc of the hole type in which the reflectance of a surface changes responding to the recorded information, or of the phase shifting type, as well as the magneto-optical disc of the above embodiment.

A third embodiment will be described referring to FIGS. 5 and 6A through 6K.

Figure 5:
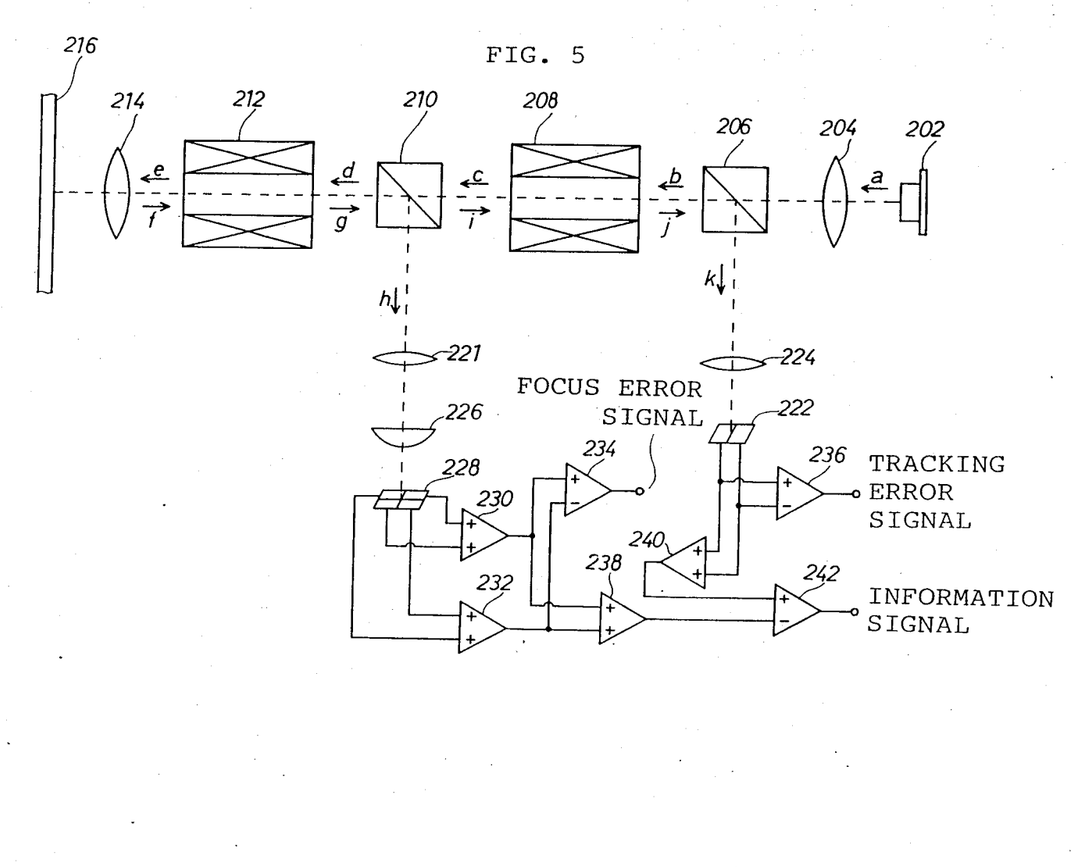
FIG. 5 is a construction view illustrating the optical system of an optical reader of a third embodiment.
Figure 6A:
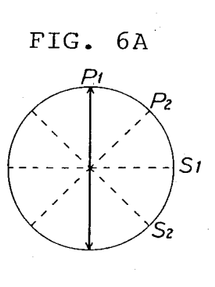
FIGS. 6A through 6K are explanatory views illustrating respective serial changes in the plane of polarization of a laser beam passing through the optical system in the optical disc head shown in FIG. 5.
Figure 6B:
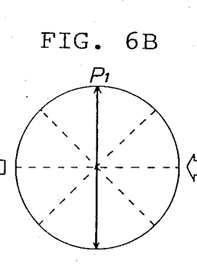
Figure 6C:
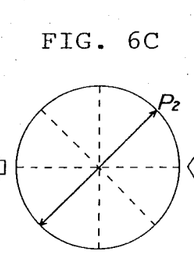
Figure 6D:
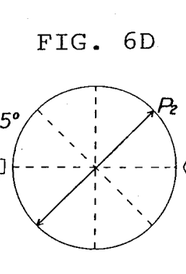

In an optical head of this embodiment, a laser diode 202 emits a laser beam "a" with the P1 plane of polarization (FIG. 6A). The beam "a" is paralleled through a collimating lens 204, and enters a first polarized beam splitter 206. The splitter 206 is so constructed to pass a beam with the P1 plane of polarization and to reflect a beam with the S1 plane of polarization perpendicular to the P1 plane, which therefore passes the laser beam "a". The passing beam "b" (FIG. 6B) goes through a first Faraday rotator 208 where the P1 plane of polarization is rotated 45° (FIG. 6C). The beam "c" with the P2 plane of polarization enters a second beam splitter 210. The splitter 210 is so constructed to pass a beam with the P2 plane of polarization and to reflect a beam with the S2 plane perpendicular to the P2 plane, which thereby passes the incident laser beam "c".

Figure 6E:
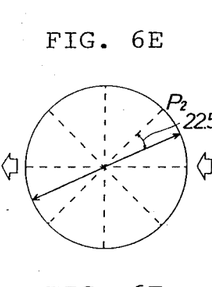
Figure 6F:
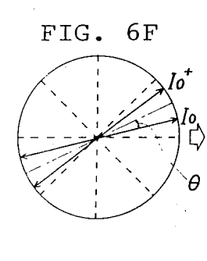
Figure 6G:
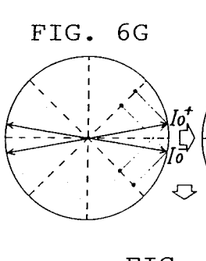
Figure 6H:
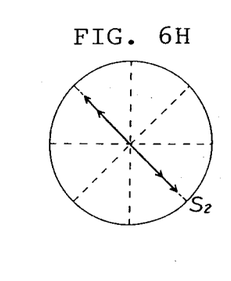
Figure 6I:
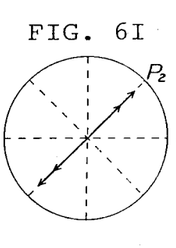
Figure 6J:
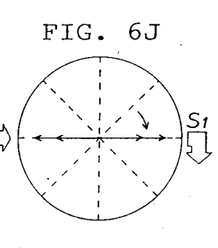
Figure 6K:
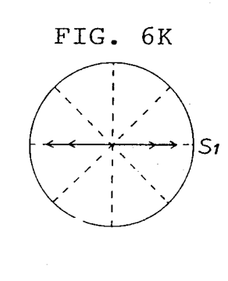

The beam "d" passing through the splitter 210 (FIG. 6D), enters a second Faraday rotator 212 in which a plane of polarization of the incident beam "d" is rotated 22.5° (FIG. 6E). The beam "e" after the second rotator 212 is irradiated onto a magneto-optical disc 216 via an objective lens 214. The plane of polarization of the beam rotates by $+\theta$ or $-\theta$ in response to the magnetic polarity of a beam spotting point on the disc 216. the beam reflected by the disc 216, i.e., "f" (FIG. 6F), then passes through the second Faraday rotator 212 which further rotates the plane of polarization 22.5°. The beam "g" with its plane of polarization rotated $(45\pm\theta)°$ by going through the rotator 212 (FIG. 6G), enters the splitter 210. Here, the beam splitter 210 splits the beam "g" with an intensity I into a laser beam "h" with the S2 plane of polarization (FIG. 6H) and an intensity I·sin$(45\pm\theta)$, and into a laser beam "i" with the P2 plane of polarization (FIG. 6I) and an intensity I·cos$(45\pm\theta)$. The intensities of the beams "h" and "i" are alternately changed in accordance with a rotational direction of the laser beam ($+\theta$ or $-\theta$) reflected from magneto-optical disc 216. The laser beam "h" is separated from the main optical path to enter a 4D-PD 228 via a condensing lens 221 and a cylindrical lens 226. The laser beam "i" passes through the splitter 210 to enter the first rotator 208 where the plane of polarization is rotated 45° (FIG. 6J). The laser beam "j" with the S1 plane of polarization enters the first splitter 206. Since the splitter 206 is so constructed to reflect a beam with S1 plane of polarization, the beam "j" is separated without passing through the splitter 206, and then enters a 2D-PD 222 via a condensing lens 224.

The 4D-PD 228 is for generating a focus error signal representing a condition of the incident beam spotted on the disc 216 for a well known astigmatic focusing method. Respective outputs from the diagonally placed diodes are added by adder amplifiers 230 and 232. Then, the difference between the added outputs are obtained by a differential amplifier 234 to generate a focus error signal. The 2D-PD 222 is for generating a tracking error signal representing a condition of the incident beam tracking the disc 216 by the well-known push-pull method. The tracking error signal is detected by obtaining the difference between the outputs from the respective photo diodes by the differential amplifier 236. Each intensity of the incident laser beams "h" and "k" ("i") to the respective photo diodes 222 and 228 alternately changes in response to the rotational direction of the plane of polarization of a laser beam reflected from the disc 216. The intensity of the beam "h" is measured by adding the outputs from the adder amplifiers 230 and 232 with an adder amplifier 238. The intensity of the beam "k" is measured by adding the respective outputs from the 2D-PD 222 by an adder amplifier 240. The difference between the two detected signals is obtained by a differential amplifier 242, thereby detecting a rotational direction of the beam reflected from the disc 216, i.e., information recorded thereon. In the optical head of this embodiment, a laser beam reflected by the magneto-optical disc 216 is wholly separated from the main optical path and enters into the 2D-PD 222 and the 4D-PD 228. The emitted beam is transmitted effectively to the sensors without loss, resulting in reliable detection of signals. Since the light reflected by the disc 216 is prevented from returning to the laser diode 202, noise is avoided. Since an information signal is detected according to the difference of the intensities of reflecting lights split by the splitter 210, even if beam reflectance changes due to dust on the disc, reliable signals are still obtained.

The Faraday rotator used in this embodiment has its rotational angle of 22.5°; however, the rotator with the angle of either 67.5°, 112.5°, or 157.5° is also effective. A few degrees of deviation from those rotational angles is negligible in so far as the intensities of the reflecting beam to be split by the splitter 210 are alternately weakened or strengthened in accordance with the rotational direction of the plane of polarization of an irradiated beam reflected from the disc 216. As described in the second embodiment, other kinds of light sources or detection devices besides those used in this embodiment can be employed. A fourth embodiment of this invention will be described referring to FIGS. 7 and 8A through 8L.

Figure 7:
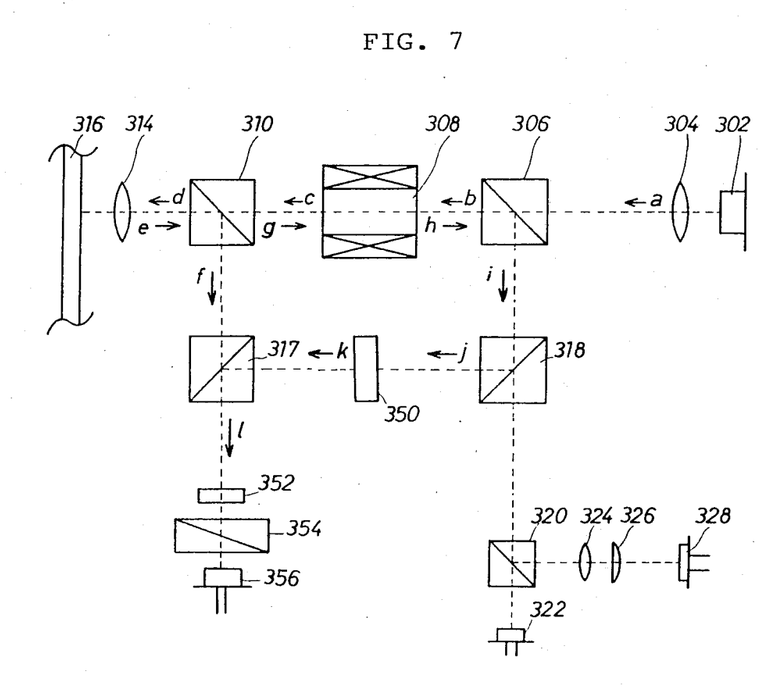
FIG. 7 is a construction view illustrating an optical system of an optical head for a magneto-optical disc of a fourth embodiment.
Figure 8A:
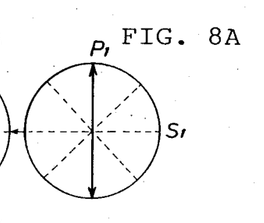
FIGS. 8A through 8L are explanatory views illustrating the respective changes in the plane of polarization of a laser beam passing through the optical system in the optical disc head shown in FIG. 7.
Figure 8B:
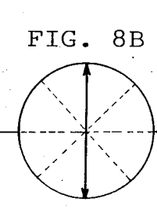
Figure 8C:
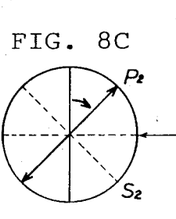
Figure 8D:
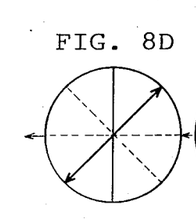
Figure 8E:
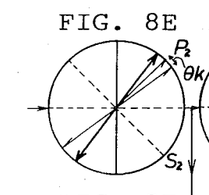
Figure 8F:
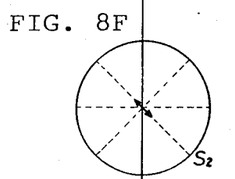

In an optical head according to this embodiment, when a laser beam "a" with P1 plane of polarization (FIG. 8A) is emitted from a laser diode 302, the light "a" is paralleled by a collimating lens 304. The light beam "a" passes through a first polarized beam splitter 306 which is so constructed to pass a laser beam with the P1 plane of polarization, and to reflect the one with S1 plane of polarization perpendicular to the P1. The passing beam, i.e., "b" (FIG. 8B), enters a Faraday rotator 308 for rotating a plane of polarization of the incident beam 45°, thus resulting in the laser beam "c" with plane of polarization converted from the P1 to P2 plane (FIG. 8C). The beam "c" passes through a second polarized beam splitter 310 which is so constructed to pass a beam with P2 plane of polarization, and to reflect a beam with S2 plane perpendicular to the P2 plane.

The laser beam "d" (FIG. 8D) passing through the splitter 310 is irradiated onto a magneto-optical disc 316 via an objective lens 314, which is reflected with the plane of polarization rotated $+\theta k$ or $-\theta k$ in accordance with a magnetic polarity at the spotting point. The reflected beam, i.e., "e" (FIG. 8E), enters again, the splitter 310 via the lens 314.

Figure 8G:
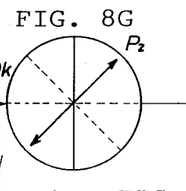
Figure 8H:
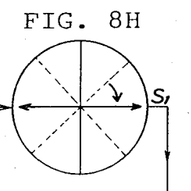
Figure 8I:
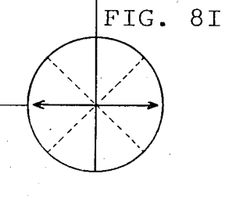
Figure 8J:
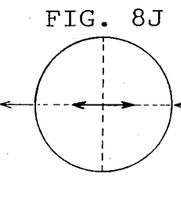
Figure 8K:
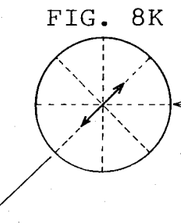

The splitter 310 splits the laser beam "e" into a beam "f" with an intensity I·sin$(\pm\theta k)$ and S2 plane of polarization (FIG. 8F), which is influenced by the Kerr effect, and a beam "g" with an intensity I·cos$(\pm\theta k)$ and P2 plane of polarization (FIG. 8G). The laser beam "f" is separated from the optical path, then enters a third polarized beam splitter 317. The laser beam "g" enters the rotator 308 where the plane of polarization is rotated 45° to be parallel to S1 (FIG. 8H). The laser beam "h" with the S1 plane of polarization enters the first splitter 306 where the beam "h" is separated from the main optical path since the splitter 306 reflects the beam with the S1 plane of polarization. The separated beam "i" (FIG. 8I) is split into a passing beam and a reflecting beam "j" (FIG. 8J) by a first half mirror 318.

The passing laser beam enters a second half mirror 320 in which the beam is further split into two. One of the split beams enters a 2D-PD 322, and the other enters 4D-PD 328 via a condensing lens 324 and a cylindrical lens 326. The two beams are received as a tracking signal and a focus error signal, respectively.

The laser beam "j" reflected by the half mirror 318 passes through a rotator 350 where the plane of polarization is rotated 45°. The beam "k" (FIG. 8K) with P2 plane of polarization enters the splitter 317. The beam "k" with the P2 plane is divided in its entirety by the splitter 317 which is so constructed to reflect a beam with the P2 plane and to pass a beam with S2 plane of polarization. The splitter 317 further passes the laser beam "f" with the S2 plane, which has been split by the second splitter 310, combining the reflecting beam "k" and the passing beam "f".

Figure 8L:
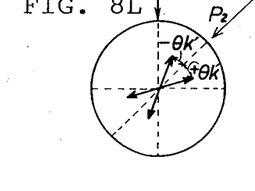
Figure 9:
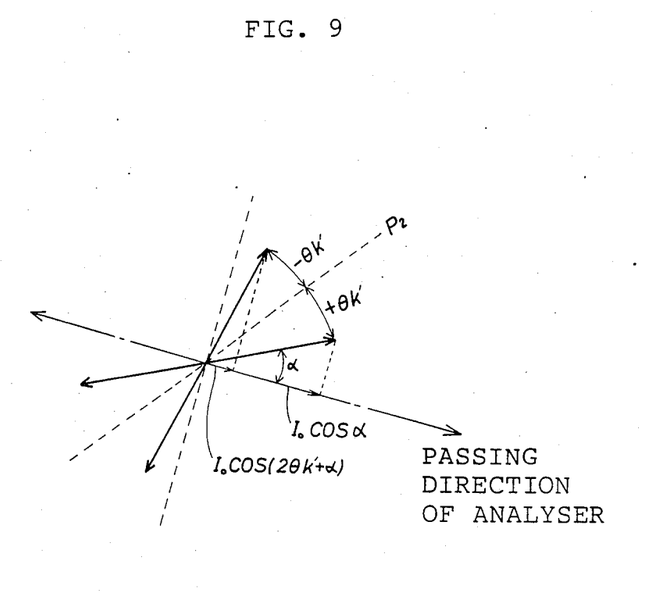
FIG. 9 is an explanatory view illustrating the direction of a plane of polarization of a laser beam shown by arrows, and the direction of an analyzer which the laser beam enters.

Since the combined laser beam "1", as shown in FIG. 8L, has an elliptical polarization due to the different path length of the two laser beams, the beam "1" is transformed into a linearly polarized beam by a QWP 352. The plane of polarization of the beam "1" after the QWP 352 is rotated either "$\theta k'$" or "$-\theta k'$" in relation to the P2 plane. The angle $\theta k'$ is greater than the Kerr rotational angle $\theta k$ of a laser beam immediately after being reflected by the disc 316. As shown in FIG. 9, the laser beam "1" passes through an analyzer 354 which is so constructed to pass an incident beam at an angle ("$\theta k' + \alpha$)° from P2. The passing beam then enters the photo diode 356. If the intensity of the laser beam before entering the analyzer 354 is Io, the laser beam with its plane of polarization rotated $-\theta k'$ from the P2 direction weakens into a beam with intensity Io·cos(2$\theta k' + \alpha$), when it is received by the photo-diode 356. The beam with its plane of polarization rotated by "$\theta k'$" from the P2 is received by the photo diode 356 with relatively strong intensity of Io·cos$\alpha$. If a threshold level is provided in the middle of the difference of luminous energy of the received beam, a magnetic polarity recorded on the magneto-optical disc 316 is detected so that the stored information is read out.

In the optical head for a magneto-optical disc according to the present embodiment, a laser beam reflected by a magneto-optical disc is split to be separated from the main optical path by two splitters, with no loss of the beam. Accordingly, the reflected laser beam is effectively transmitted to the detection system and the reflected beam is prevented from returning to the laser diode, thereby avoiding noise and driving the laser diode with certainty.

A Kerr rotational angle caused by the magneto-optical disc can be detected by the detection system at apparently greater angles, thereby improving the S/N ratio of a detection signal.

Figure 10:
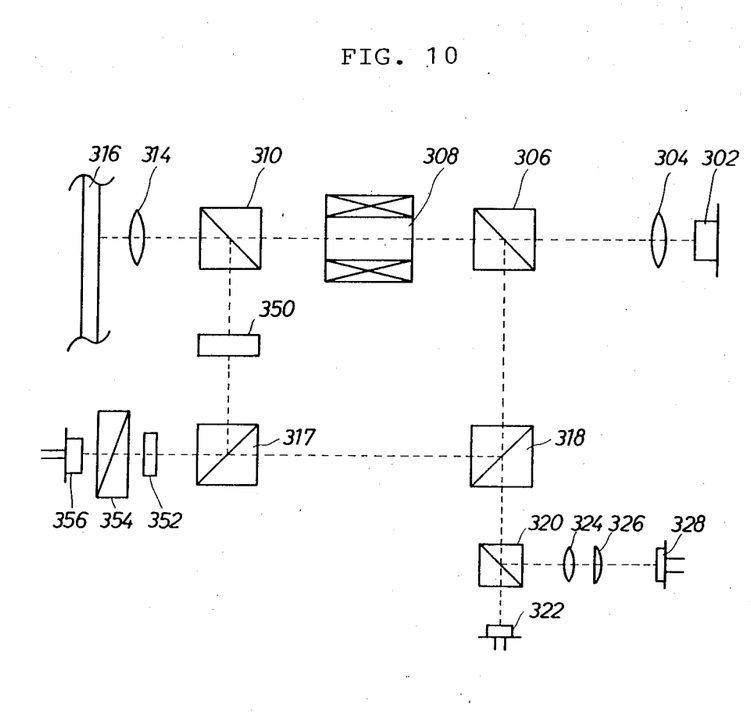
FIG. 10 is a construction view illustrating an optical system in accordance with FIG. 7, with some portion altered.

As shown in FIG. 10, in which case a polarization plane rotator 350, a QWP 352, an analyzer 354, and a photo-diode 356 are placed symmetrical to the reflection surface of the beam splitter 317, the Kerr rotation angle is also detected as well as the aforementioned embodiment, thereby simplifying the construction of the optical head.

A Faraday rotator can be added between the magneto-optical disc 316 and the polarized beam splitter 310. In this case, detection systems after the beam splitter 317 and the half mirror 318 should be replaced with each other.

While the invention has been shown and described in its preferred embodiments, it will be clear to those skilled in the art to which it pertains that many changes and modifications may be made thereto without departing from the scope of the invention.

What is claimed is:

1. A disc head for an optical disc comprising:
   a light source for emitting a beam of light toward an optical disc;
   a Faraday rotator, which is disposed between the light source and the optical disc, for rotating a plane of polarization of the light beam emitted from the light source by 45°;
   a beam splitter, which is disposed between the Faraday rotator and the light source, for passing a component with a specific plane of polarization of the light beam emitted from the light source, and for reflecting a light beam with a plane of polarization perpendicular to the specific plane of polarization which has again passed the Faraday rotator after being reflected by the optical disc; and
   a light sensor for sensing a light beam reflected by the beam splitter.

2. A disc head for an optical disc according to claim 1, wherein the optical disc stores information by means of a change in a reflectance of a surface of a disc.

3. A disc head for a magneto-optical disc comprising:
   a light source for emitting a beam of linearly polarized light toward a magneto-optical disc;
   a first beam splitter, which is disposed between the light source and the magneto-optical disc, for passing a component with a specific plane of polarization of the light beam emitted from the light source and for reflecting a light beam with a plane of polarization perpendicular to the specific plane of polarization;
   a first Faraday rotator, which is disposed between the first beam splitter and the magneto-optical disc, for rotating a plane of polarization of the light beam that has passed the first beam splitter by 45°;
   a second beam splitter, which is disposed between the first Faraday rotator and the magneto-optical disc, for passing the light beam that has passed the first Faraday rotator and for reflecting the light beam with a plane of polarization perpendicular to the plane of polarization of the light beam that has passed the first Faraday rotator; and
   first and second light sensors provided for sensing the light reflected from the first and second beam splitters respectively after being reflected by the optical disc.

4. A use of the disc head according to claim 3 for a disc head of an optical disc.

5. A disc head for a magneto-optical disc according to claim 3, wherein:
   the disc head further comprises a third beam splitter for splitting the light beam reflected by the first beam splitter after being reflected by the disc;
   the second light sensor receives the light beams from the second beam splitter and from the third beam splitter to generate a signal representative of information on the disc; and
   the first light sensor receives the light beam from the third beam splitter to generate a focusing and/or tracking control signal.

6. A disc head for a magneto-optical disc according to claim 3, wherein the disc head further comprises a second Faraday rotator disposed between the second beam splitter and the magneto-optical disc for rotating a plane of polarization of an incident light beam by 45° plus or minus a small angle.

7. A disc head for a magneto-optical disc according to claim 3, wherein the disc head further comprises a second Faraday rotator disposed between the second beam splitter and the magneto-optical disc for rotating a plane of polarization of an incident light beam by an angle selected from the group consisting of 22.5°, 67.5°, 112.5° and 157.5°.

8. A disc head for a magneto-optical disc according to claim 6, wherein the second light sensor generates a focusing and/or tracking control signal and the first light sensor generates a signal representative of information on the disc.

9. A disc head for a magneto-optical disc according to claim 7, wherein the disc head further comprises an adder by which signals generated by the first and second light sensors are added to generate a signal representative of information on the disc.

* * * * *